US010248622B2

(12) United States Patent
Verma

(10) Patent No.: US 10,248,622 B2
(45) Date of Patent: Apr. 2, 2019

(54) VARIABLE VIRTUAL SPLIT DICTIONARY FOR SEARCH OPTIMIZATION

(71) Applicant: SAP SE, Walldorf (DE)

(72) Inventor: Sudhir Verma, Gurgaon (IN)

(73) Assignee: SAP SE, Walldorf (DE)

( * ) Notice: Subject to any disclaimer, the term of this patent is extended or adjusted under 35 U.S.C. 154(b) by 330 days.

(21) Appl. No.: 14/672,233

(22) Filed: Mar. 30, 2015

(65) Prior Publication Data

US 2016/0292220 A1  Oct. 6, 2016

(51) Int. Cl.
*G06F 17/30* (2006.01)
*G06F 16/2453* (2019.01)
*G06F 16/2455* (2019.01)
*G06F 16/22* (2019.01)

(52) U.S. Cl.
CPC ...... *G06F 16/24537* (2019.01); *G06F 16/221* (2019.01); *G06F 16/24554* (2019.01); *G06F 16/24561* (2019.01)

(58) Field of Classification Search
CPC .......................... H03M 7/30; G06F 17/30486
See application file for complete search history.

(56) References Cited

U.S. PATENT DOCUMENTS

| 5,153,591 A * | 10/1992 | Clark | H03M 7/3088 341/51 |
| 2008/0294863 A1 * | 11/2008 | Faerber | H03M 7/3084 711/170 |
| 2009/0254521 A1 * | 10/2009 | Raman | H03M 7/40 |
| 2009/0300040 A1 * | 12/2009 | Kaijima | G06F 17/30306 |
| 2010/0299316 A1 * | 11/2010 | Faerber | H03M 7/3084 707/693 |
| 2011/0208754 A1 * | 8/2011 | Li | G06F 17/30286 707/750 |
| 2012/0117064 A1 | 5/2012 | Draese et al. | |
| 2012/0303633 A1 | 11/2012 | He et al. | |

(Continued)

FOREIGN PATENT DOCUMENTS

| EP | 1995877 A1 | 11/2008 |
| WO | WO2008/016877 A2 | 2/2008 |

OTHER PUBLICATIONS

European Search Report for EP Application No. 16000744.9-1507, dated Aug. 31, 2016, 12 pages; EPO, Munich, Germany.

*Primary Examiner* — Usmaan Saeed
*Assistant Examiner* — William P Bartlett
(74) *Attorney, Agent, or Firm* — Buckley, Maschoff & Talwalkar LLC

(57) ABSTRACT

Methods and system are disclosed that optimize attribute vectors to search for data. In one aspect, a reordering optimization model is executed to reorder the attribute vectors. The attribute vectors may include value identifiers associated with data. The attribute vectors are assigned priorities, sequence score corresponding to each attribute vector is computed and the attribute vectors are reordered based on the computed sequence score. The reordered attribute vectors are logically partitioned into attribute vector blocks by executing a partitioning optimization model. The attribute vector blocks may be generated upon executing the partitioning optimization model. The value identifiers in the attribute vector blocks may be rearranged to optimize the attribute vectors to search for data.

11 Claims, 11 Drawing Sheets

(56) References Cited

U.S. PATENT DOCUMENTS

2015/0212972 A1* 7/2015 Boettcher ............... G06F 15/78
  712/4
2015/0347087 A1* 12/2015 Dickie ..................... G06F 7/36
  707/753

* cited by examiner

| | 3 | 4 | 5 | 6 | 7 | 8 | 9 |
|---|---|---|---|---|---|---|---|
| 3 | 27 | 64 | 125 | 216 | 512 | 729 | 729 |
| 4 | 81 | 256 | 625 | 1296 | 4096 | 6561 | 6561 |
| 5 | 243 | 1024 | 3125 | 7776 | 32768 | 59049 | 59049 |
| 6 | 729 | 4096 | 15625 | 46656 | 262144 | 531441 | 531441 |
| 7 | 2187 | 16384 | 78125 | 279936 | 2097152 | 4782969 | 4782969 |
| 8 | 6561 | 65536 | 390625 | 1679616 | 16777216 | 43046721 | 43046721 |
| 9 | 19683 | 262144 | 1953125 | 10077696 | 134217728 | 3.87E+08 | 387420489 |
| 10 | 59049 | 1048576 | 9765625 | 60466176 | 1073741824 | 3.49E+09 | 3486784401 |
| 11 | 177147 | 4194304 | 48828125 | 362797056 | 8589934592 | 3.14E+10 | 31381059609 |
| 12 | 531441 | 16777216 | 244140625 | 2176782336 | 68719476736 | 2.82E+11 | 2.8243E+11 |
| 13 | 1594323 | 67108864 | 1220703125 | 13060694016 | 5.49756E+11 | 2.54E+12 | 2.54187E+12 |
| 14 | 4782969 | 268435456 | 6103515625 | 78364164096 | 4.39805E+12 | 2.29E+13 | 2.28768E+13 |
| 15 | 14348907 | 1073741824 | 30517578125 | 4.70185E+11 | 3.51844E+13 | 2.06E+14 | 2.05891E+14 |

FIG. 4

VARIABLE VIRTUAL SPLIT DICTIONARY FOR SEARCH OPTIMIZATION

BACKGROUND

Advancements in database technologies have provided efficient means for data storage. For instance, data may be compressed using data compression techniques, may be associated with identifiers, and stored in a table in a database. Such data may be searched using the identifiers. When the data is searched using a value, a database search engine may first determine an identifier associated with the value and search the table in the database. As the database search engine may search through an entire dataset stored in the table, the searching may be inefficient and time consuming. Although compression of data improves the storage efficiency, optimizing the search for data may be challenging.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 4 is a block diagram exemplarily illustrating a matrix including a number of nodes generated, according to an embodiment.

DETAILED DESCRIPTION

Embodiments of techniques related to variable virtual split a dictionary for search optimization are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Volume of business data associated with an enterprise may witness an exponential surge as a function of time. The business data may be structured and unstructured data, transactional data, data related to business processes, etc. Such business data may reside in data structures (e.g. tables, flat files, etc.) in data stores. A data store may correspond to an in-memory database, a web-based database, a conventional database, etc. The in-memory database may include a main memory and an underlying hardware for executing storage and computational operations. Typically, the business data may be available in the main memory and operations such as, computations and memory-reads may be executed in the main memory.

In an embodiment, a table in a database may be represented by a two dimensional data structure with cells organized in rows and columns. For instance, the business data in the in-memory database may be stored as a row store or a column store. In the row store, the fields of every row may be stored sequentially, while in the column store, the fields of every column may be stored in contiguous memory locations. Storage modeled as row store or column store may be accessed by various components of the in-memory management system. Such components may include front-end development application, database application, a query processing engine, etc.

In an embodiment, when data is stored in the column store, the values associated with business data may be intrinsically sorted and stored in several contiguous locations that may be adjacent to each other. The values may be compressed using known compression techniques such as, run-length encoding, cluster coding, dictionary coding, etc. Compression may have advantages such as, reduced data volumes that may require less main memory or hard disk capacity, reduced data flows, lower demands on processor architectures, network bandwidth, etc.

Figure 1:
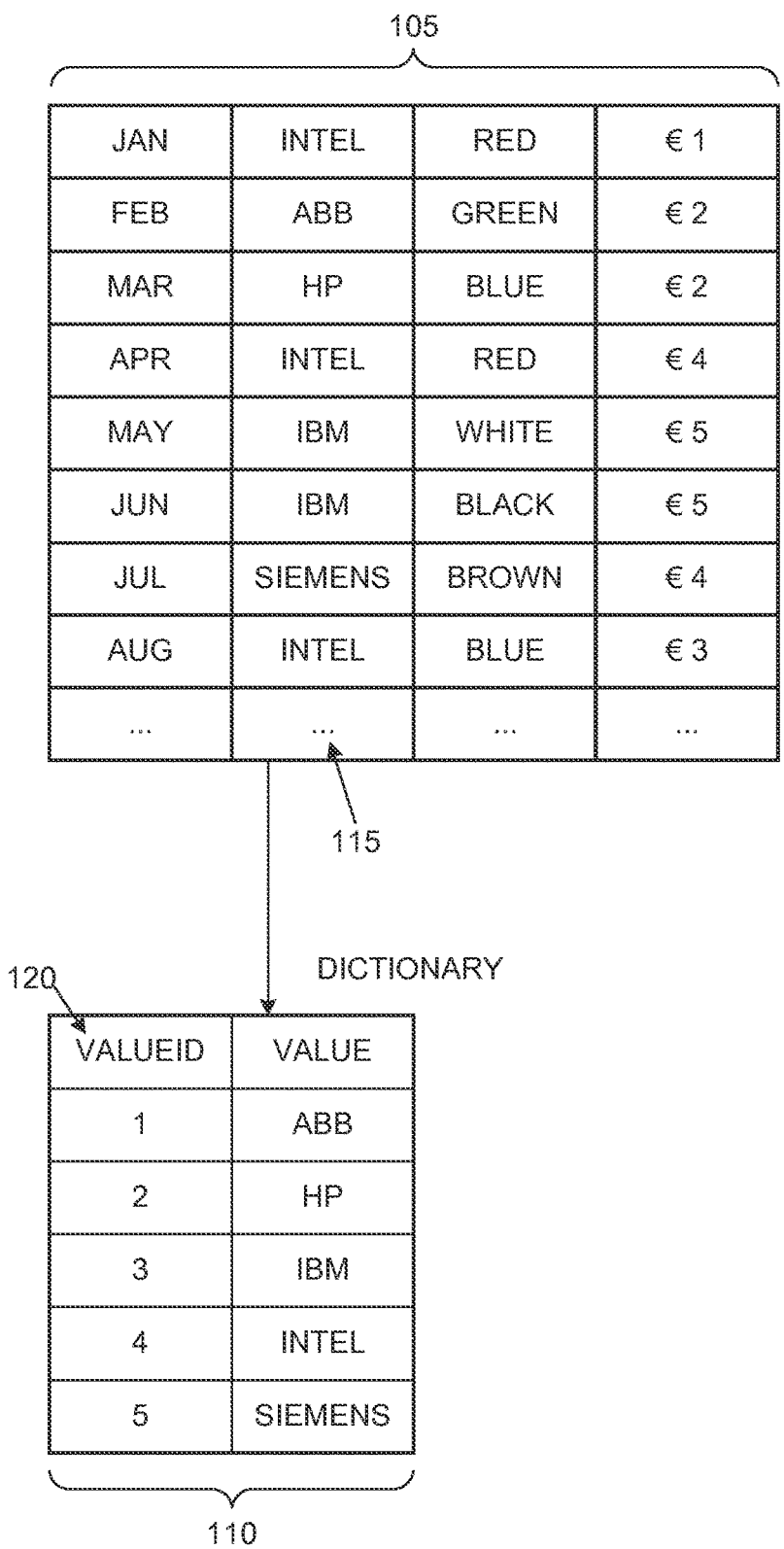
FIG. 1 is a block diagram illustrating a table of structured data, and a dictionary for a column of a table, according to an embodiment.

FIG. 1 is a block diagram illustrating a table of structured data, and a dictionary for a column of the table, according to an embodiment. By way of illustration, FIG. 1 shows column 115 in table 105 associated with dictionary structure 110. The dictionary structure 110 includes value identifiers (ValueIds) 120 associated with the values in the column 115. In an embodiment, dictionary structure 110 may provide dictionary-based data compression, thereby reducing an amount of data stored in table 105. Typically dictionary structure 110 may represent a list of sorted values, as shown in column 115 and value identifiers 120.

In an embodiment, to reduce the memory occupied by column 115 of table 105 using a dictionary-based compression, a sorted list of different values as shown in column 115 may be generated and the different values may be represented by identifiers (e.g., integers). The integers may represent placeholders for the values in table 105. The largest numbers needed to represent the values may be noted. For instance, when 'C' represents cardinality for a column that includes a number of different values appearing in it, 'N' represents the total length of the column and the value of 'C' is much less than 'N', then dictionary-based compression may be advantageous. The dictionary-based compression may reduce the memory consumption, in contrast to storing of the values in the table. A sorted list of 'C' values may be referred to as a dictionary structure and may be used to look up the values of the numbers appearing in the table, whenever these values need to be determined.

By way of example, table 105 includes column 115 having values such as, "INTEL", "ABB", "HP", etc. Dictionary structure 110 includes value identifiers 120 that represent the values of column 115 (e.g., attribute vector). When values of column 115 of table 105 are represented with the value identifiers 120, it may reduce memory footprint. Value identifiers 120 in the new table, along with the dictionary 110 may be used to reconstruct the values of column 115.

In an embodiment, searching for data in a database/table may be optimized by rearranging the ValueIds in attribute vectors (e.g., columns) of the table. Each attribute vector may be associated with a dictionary structure. In an embodiment, the dictionary structure associated with the attribute vectors may be identified. The attribute vectors may be assigned priority based on business logic and reordered based on the priority. The reordered attribute vectors may be logically partitioned (e.g., split) to generate attribute vector blocks. The ValueIds in the attribute vector blocks may be rearranged to optimize the attribute vectors for searching data.

Figure 2:
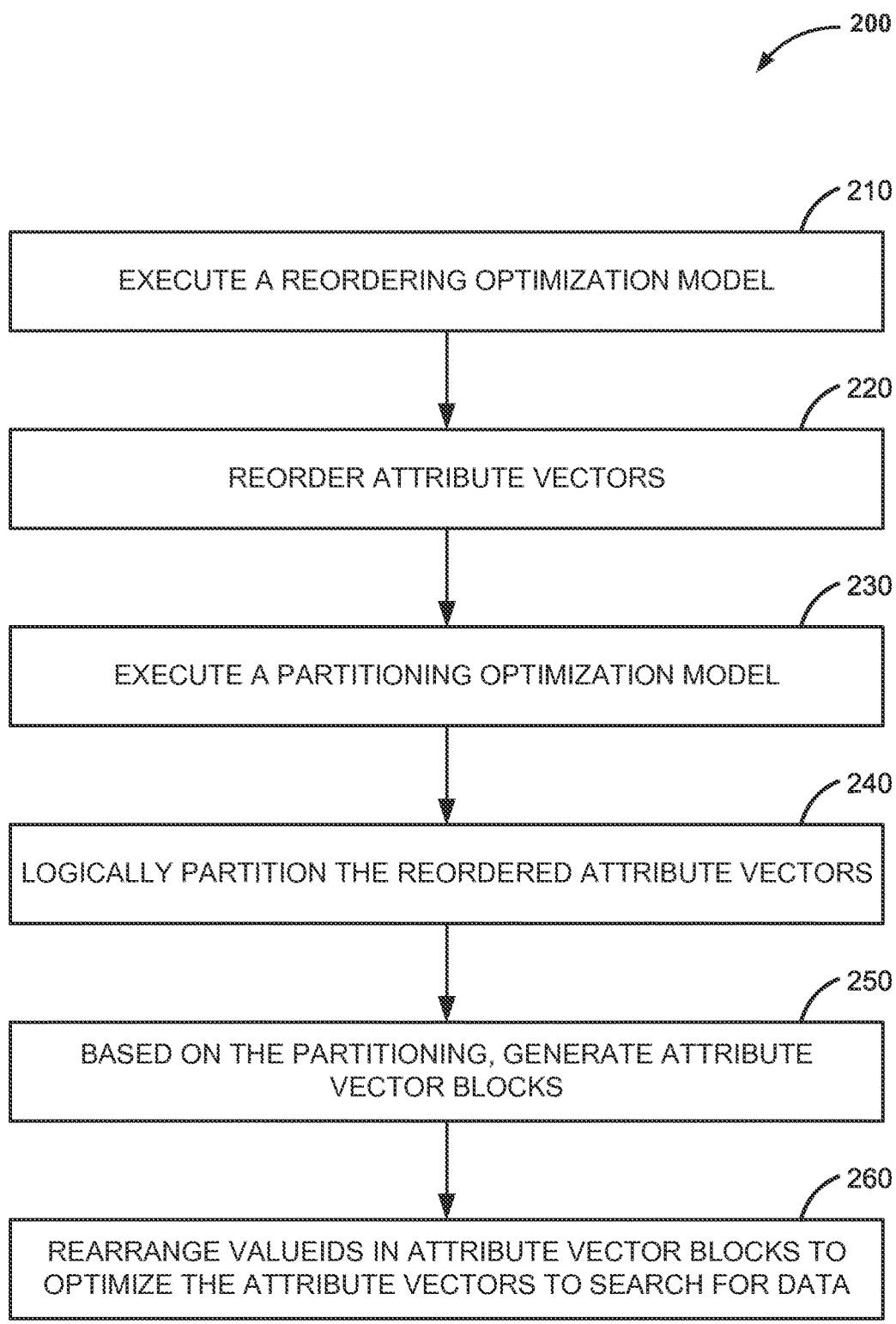
FIG. 2 is a flow diagram illustrating a process to optimize an attribute vector to search for data, according to an embodiment.

FIG. 2 is a flow diagram illustrating process 200 to optimize an attribute vector to search for data, according to an embodiment. Process 200, upon execution, optimizes attribute vectors to search for data. In an embodiment, the attribute vectors (e.g., columns) of a table may include dictionary-based compression values and have a dictionary structure associated with it. A mechanism to search for data in the attribute vectors may be optimized by logically partitioning the attribute vectors to generate attribute vector blocks and rearranging the ValueIds in the logically partitioned attribute vector blocks.

In an embodiment, data may be stored in an in-memory database as the column store. Such columns may herein be referred to as attribute vectors. In an embodiment, the query processing engine of the in-memory database receives a request to search for data. The query processing engine may process the query and forward the request to the in-memory database to search for the data. The data may be associated with dictionary structures and stored in multiple attribute vectors as ValueIds.

In an embodiment, a reordering optimization model is executed, at 210. The execution of reordering optimization model may execute operations, such as assigning priority to the attribute vectors based on business logic, assigning priority to the tables based on business logic, computing a sequence score for each attribute vector based on multiple parameters, computing a sequence score for a table based on multiple parameters, reordering the attribute vectors based on the computed sequence score, reordering the tables based on the computed sequence score, etc.

In an embodiment, the attribute vectors are reordered at 220. The attribute vectors may be reordered based on a priority assigned to the attribute vectors. The business logic for assigning priority to the attribute vectors may include determining a frequency of data access from the attribute vector (e.g., based on historical data access, percentage of queries referencing specific attribute vectors, etc.), an amount of memory consumed by the attribute vector (e.g., size of the attribute vector), etc. Upon assigning the priority to the attribute vectors, a sequence score for each attribute vector may be computed. The sequence score may be computed based on the assigned priority and/or the size of the attribute vector. Based on the computed sequence score, the attribute vectors may be reordered (e.g., sorted in ascending order or descending order).

In an embodiment, a partitioning optimization model is executed at 230. The reordered attribute vectors are logically partitioned at 240. The logical partitioning may include logically partitioning or splitting the attribute vectors into attribute vector blocks. The attribute vector blocks are generated at 250. The attribute vector blocks may include ValueIds associated with the data. In an embodiment, the execution of the partitioning optimization model may execute operations, such as determining a partitioning model (e.g., a greedy recursive approximation model, a non-linear approximation model, a tree bounding model, a random approximation model, etc.) based on a memory constraint; determining an optimal number of logical partitions to be created on the attribute vectors; logically partitioning (e.g., creating logical partitions) the attribute vectors to generate attribute vector blocks, etc.

In an embodiment, the attribute vectors may be logically partitioned based on the memory constraints. Such memory constraints may depend on the amount of memory consumed by the attribute vector, an amount of memory available to create logical partitions on the attribute vectors, etc. In an embodiment, based on the memory constraints, the number of logical partitions to be created on each attribute vector block may be different (e.g., variable number of splits or partitions. At 260, the ValueIds stored in the logically partitioned attribute vector blocks are rearranged to optimize the attribute vectors to search for data.

Arranging Attribute Vectors in an Order

In an embodiment, ordering may correspond to sequencing or arranging (e.g., of successive objects) based on criteria. When the attribute vectors are logically partitioned, the amount of memory consumed by the attribute vectors increases exponentially. For instance, the amount of memory consumed by the attribute vectors increases exponentially, when the number of logical partitions to be created on the attribute vector increases linearly. Hence, the overhead of amount of memory consumed by the attribute vectors may be optimally reduced by reordering the attribute vectors based on the priority.

In an embodiment, the amount of memory consumed (e.g., memory used to store the ValueIds) by an attribute vector may depend on unique values of the data (e.g., the size of the dictionary structure depends on unique values of data (e.g., strings, integers, etc.)). The attribute vectors may be assigned priority based on business logic and a sequence score for each attribute vector may be computed. Based on the computed sequence score, the attribute vectors may be reordered.

In an embodiment, the criteria for assigning the priority the attribute vectors may include:

When the attribute vector including the data (e.g., ValueIds) is accessed and/or queried frequently and/or the amount of memory consumed (e.g., size) by the attribute vector is higher (e.g., in comparison to the memory consumed by other attribute vectors), the attribute vector (e.g., first attribute vector) may be assigned a highest priority.

When the attribute vector including the data (e.g., ValueIds) is accessed and/or queried frequently and/or the amount of memory consumed (e.g., size) by the attribute vector is lower (e.g., in comparison to the first attribute vector), the attribute vector (e.g., second attribute vector) may be assigned a second highest priority, and so on.

When the attribute vectors including the data (e.g., ValueIds) are assigned equal priorities (e.g., using the above criteria), the attribute vector may be prioritized and reordered based on the amount of memory consumed (e.g., size) by the attribute vector.

When the attribute vectors do not meet any of the above criteria, they may be sequentially assigned lower priorities.

In an embodiment, upon assigning priorities to the attribute vectors, the sequence score for each attribute vector may be computed. By way of example, the sequence score may be computed based on the assigned priority and the amount of memory consumed by the attribute vectors. The sequence score for the attribute vector may be computed, using the equation:

$$\text{Sequence score of an attribute vector} = \frac{2 * P_N * T_N}{(P_N + T_N)} \quad \text{Equation (1)}$$

In equation (1) above, '$P_N$' represents a normalized priority assigned to an attribute vector; '$T_N$' represents a normalized size of attribute vector (e.g., amount of memory consumed by attribute vector for storing ValueIds). In an embodiment, upon computing the sequence score for each attribute vector, the attribute vectors may be sorted in an order (e.g., ascending order or descending order) prior to logically partitioning the attribute vectors.

Partitioning Attribute Vectors

In an embodiment, partitioning (e.g., logical partitioning) may correspond to division of an element (e.g., an attribute vector or a column) into distinct independent parts. Logically partitioning may generally improve manageability of the stored data and performance when certain operations (e.g., searching) are executed on the attribute vectors. In an embodiment, upon computing the sequence score and sorting (e.g., reordering) the attribute vectors based on the computed sequence score, the attribute vectors may be logically partitioned. An optimal number of logical partitions to be created on each attribute vector may vary (e.g., variable number of logical partitions) and may depend on a memory constraint associated with the attribute vector. In an embodiment, the attribute vectors may be logically partitioned by executing the partitioning optimization model.

In an embodiment, upon executing the partitioning optimization model, a partitioning model (e.g., a greedy recursive approximation model, a non-linear approximation model, a tree bounding model, a random approximation model, etc.) may be determined. The partitioning model may be determined based on a memory constraint associated with the attribute vector. The memory constraint associated with the attribute vector may depend on the size of the attribute vector, the amount of memory available to store the partitioned attribute vector blocks, etc. Each attribute vector may be associated with variable (e.g., different) memory constraints. The execution of the partitioning model may determine the optimal number of logical partitions to be created on the attribute vectors. The attribute vectors may be logically partitioned into attribute vector blocks based on the determined optimal number of partitions.

In an embodiment, a determined partitioning model may include a greedy recursive approximation model. An execution of the greedy recursive approximation model (e.g., greedy recursive approximation algorithm) may be initialized by assigning a fixed number of logical partitions (e.g., maximum number of logical partitions). Upon assigning the maximum number of partitions to the attribute vector, the next step in the execution of the greedy recursive approximation algorithm may performing a validation to check if the assigned number of logical partitions against the memory constraint associated with the attribute vector. For instance, the assigned number of partitions for the attribute vector may be validated against the memory constraint associated with the attribute vector. When such a validation fails, the maximum number of logical partitions associated with the attribute vector may be decremented (e.g., decremented by '1') and the above step of validation of the attribute vector against the memory constraint may be repeated.

In an embodiment, by iteratively reducing the number of logical partitions (e.g., from maximum number of logical partitions) and validating against the memory constraint, the optimal number of logical partitions associated with each attribute vector may be determined. Thus, the execution of the greedy recursive approximation algorithm may iteratively determine the optimal number of partitions to be created on each attribute vector based on the memory constraint associated with the attribute vector.

In an embodiment, a determined partitioning model may include a non-linear approximation model. An execution of the non-linear approximation model (e.g., non-linear approximation algorithm) may include an objective of maximizing the amount of memory saved (not scanned) when performing a search for each attribute vector. To determine the optimal number of partitions to be created on the attribute vectors, the number of logical partitions may be represented by variables in polynomial equations. The amount of memory consumed by $i^{th}$ attribute vector may be computed using the equation:

Memory consumed by '$i$'th attribute vector
$$B_i = 2 * \log_2 T + \log_2 S_i \quad \text{Equation (2):}$$

In equation (2), '$S_i$' represents number of logical partitions in an attribute vector '$i$'; '$i$' represents the attribute vector (e.g., first, second, third, etc.); 'T' represents the size (e.g., in bytes) of the attribute vector (or number of records in the attribute vector). The amount of memory saved when performing a search an attribute vector may be computed/determined using the equations:

Memory saved when performing a search a Equation (3)
$$\text{first attribute vector} = T_{S1} - \left(\frac{T_{S1}}{S1} + (S_1 * B_1)\right)$$

Memory saved when performing a search in a second Equation (4)
$$\text{attribute vector} = T_{S2} - \left(\frac{T_{S2}}{S_2} + (S_1 * S_2 * B_2)\right)$$

Memory saved when performing a search '$N$'th attribute Equation (5)
$$\text{vector} = T_{SN} - \left(\frac{T_{SN}}{S_N} + (S_1 * S_2 * \ldots \ldots * S_N * B_N)\right)$$

In an embodiment, the amount of memory saved, when performing a search by each attribute vector may be multiplied by the frequency of data access (e.g., represented by a percentage based on historical data accesses) from the attribute vector. An objective function may be formulated that may optimize the amount of memory; consumed by the attribute vector. Using the above equations, the objective function may be formulated, as:

$$P_1 * \left(T_{S1} - \left(\frac{T_{S1}}{S1} + (S_1 * B_1)\right)\right) + \\ P_2 * \left(T_{S2} - \left(\frac{T_{S2}}{S_2} + (S_1 * S_2 * B_2)\right)\right) + \ldots \\ P_N * \left(T_{SN} - \left(\frac{T_{SN}}{S_N} + (S_1 * S_2 * \ldots \ldots * S_N * B_N)\right)\right)$$

Equation (6)

Equation (6) may be maximized by enforcing or applying the following constraints:

$(S_1 * B_1) + (S_1 * S_2 * B_2) + (S_1 * S_2 * \ldots * S_N * B_N) <= O_m$    Equation (7):

$(S_1 * B_1) <= O_{sm}$    Equation (8):

$(S_1 * S_2 * B_2) <= O_{sm}$    Equation (9):

$(S_1 * S_2 * \ldots * S_N * B_N) <= O_{sm}$    Equation (10):

$\forall$ attribute vectors $S_i \geq L$    Equation (11):

$\forall$ attribute vectors $S_i \leq H$    Equation (12):

$\forall$ attribute vectors $S_i$ are integers    Equation (13):

In the equations above (e.g., Equation (8)-Equation (13), 'N' represents the number of attribute vectors; '$P_i$' represents priority of the attribute vector or frequency of data access (e.g., represented by a percentage or an integer); 'L' represents the minimum number of logical partitions allowed for allocation for an attribute vector; 'H' represents maximum number of logical partitions allowed for allocations for an attribute vector; '$S_i$' represents number of logical partitions in an attribute vector 'i'; '$T_{Si}$' represents the total memory size of the attribute vector; 'T' is the total number of records in an attribute vector; '$O_m$' represents the total memory available for all the attribute vectors; '$O_{sm}$' represents maximum memory available for the '$i^{th}$' attribute vector.

In an embodiment, equation (7) may enforce and/or determine the overall memory constraint. The equation (e.g., equation (7)) determines the optimal number of logical partitions to be created on the attribute vectors (e.g., based on/using the memory constraint associated with the attribute vector). Equations (8)-(10) may also enforce and/or determine the overall memory constraint. Equation (11) may enforce the constraints on the partitioning of the attribute vectors. By way of example, equation (11) enforces the constraint that the number of logical partitions to be created for an attribute vector is greater than or equal to the minimum number of logical partitions determined by the execution of the determined partitioning model. Equation (12) enforces the constraint that the number of logical partitions to be created for an attribute vector is less than or equal to the maximum number of logical partitions determined by the execution of the determined partitioning model.

In an embodiment, the computational complexity for determining the optimal number of logical partitions by the execution of the non-linear approximation algorithm increases, when the variable '$S_i$' is restricted or constrained to represent an integer. When the variable '$S_i$' is not constrained (e.g., constraint is relaxed) to a real-number, the computational complexity may be reduced. When the non-linear approximation algorithm determines the value variable '$S_i$' as a real number (e.g., real numbers, irrational numbers, fractions, etc.), it may be mathematically modified by applying known mathematical techniques (e.g., truncation, rounding, ceiling, flooring, etc.) to represent an integer. The execution of the non-linear approximation algorithm may be optimized by using the above mathematical techniques. Upon mathematically modifying the value of variable '$S_i$', a validation may be performed to check whether the variable '$S_i$' meets the memory constraint associated with the attribute vector. In an embodiment, when the constraint for the variable '$S_i$' is relaxed, the non-linear approximation model may be referred to as a non-linear approximation model with relaxation.

In an embodiment, a determined partitioning model may include a tree bounding model. A tree structure including nodes and paths to the nodes may be generated. The tree structure may represent the possible solutions (e.g., a combination of the nodes and the paths representing optimal number of attribute vectors to be optimized and/or optimal number of logical partitions to be created on the attribute vectors). In an embodiment, the nodes of the tree structure may include a root node, leaf nodes, child nodes, etc. (e.g., 302, 304, 306, 308, 304A, 304B, 304C, 306A, 306B, 306C, 308A, 308B, 308C, 304A1, 304A2, 304A3, (304B1-304B3 (not shown)), 304C1, 304C2, 304C3, 308A1, 308A2, 308A3, (308B1-308B3) (not shown), 308C1, 308C2 and 308C3 of FIG. 3); the paths (e.g., 310, 312, 314, 310A, 310B, 310C, 312A, 312B, 312C, 314A, 314B, 314C, 310A1, 310A2, 310A3, (310B1, 310B3, 312B1, 312B3, 314B1 and 314B3 (not shown)), 312B2, 314A1, 314A2, 314A3, 314B2, 314C1, 314C2 and 314C3 of FIG. 3) from the root node to the leaf nodes or child nodes, etc. The node of the tree structure may include information related to the number of logical partitions (e.g., numerals '4', '3' and '2' in 304, 306 and 308 of FIG. 3) to be created on the attribute vector. A depth (e.g., level) of the tree structure may include multiple nodes (e.g., leaf nodes, child nodes, etc.) and may represent a number of attribute vectors to be optimized. There may be multiple paths from the root node to the leaf nodes that may correspond to multiple solutions.

In an embodiment, based on conditions (e.g., memory constraints, size of attribute vectors, priority of attribute vectors, etc.), a feasible solution may be determined. The feasible solution may correspond to determining an optimal number of attribute vectors to be optimized and/or determining an optimal number of partitions to be created on the attribute vectors. Upon determining the feasible solution, the attribute vectors may be logically partitioned into attribute vector blocks and the ValueIds in the attribute vector blocks may be rearranged. Such rearrangement may optimize the attribute vectors for searching the data.

In an embodiment, the node of the tree structure may include information, such as, number of logical partitions to be created on an attribute vector, an attribute vector index representing the depth of the tree structure, number of block transition indices (BTIs) at the depth (e.g., product of the number of logical partitions associated with depth and the number of logical partitions associated parent node), summation or aggregate of amount of memory consumed at each level (e.g., depth), objective value for the leaf node, parent, node pointers, child node pointers, etc. In an embodiment, the BTIs may be represented by BTI structures that may include data structures to store dictionary type, attribute vector block transition start index and attribute vector block transition end index.

Figure 3:
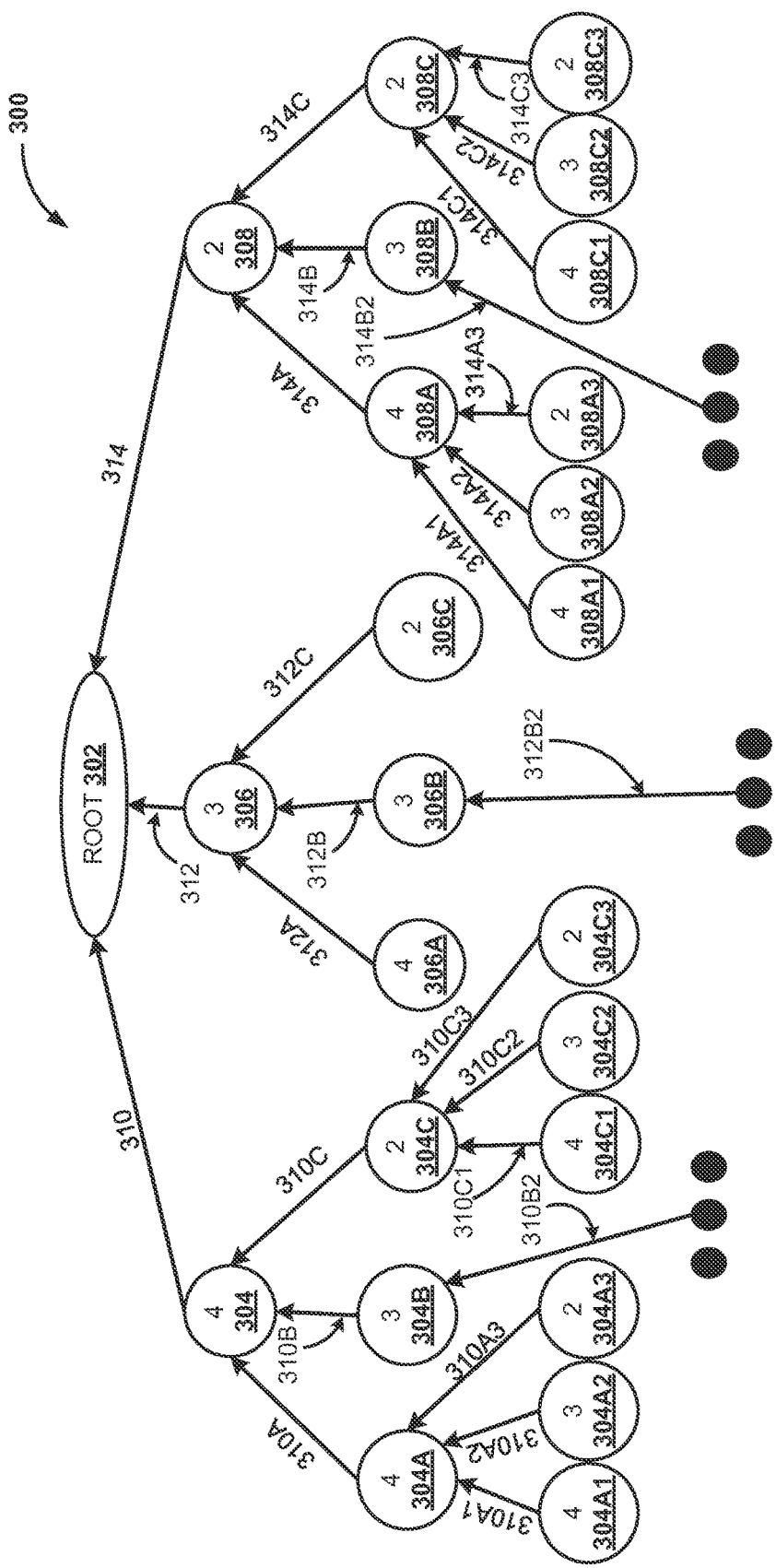
FIG. 3 is block diagram exemplarily illustrating a tree structure, according to an embodiment.

FIG. 3 is block diagram exemplarily illustrating tree structure 300, according to an embodiment. By way of illustration, FIG. 3 shows the tree structure 300 including 3 attribute vectors. The tree structure 300 includes root node 302 and leaf and child nodes (304, 306, 308, 304A, 304B, 304C, 306A, 306B, 306C, 308A, 308B, 308C, 304A1, 304A2, 304A3, (304B1-304B3 (not shown)), 304C1, 304C2, 304C3, 308A1, 308A2, 308A3, (308B1-308B3) (not shown), 308C1, 308C2 and 308C3). By way of example, consider the minimum and maximum number of logical partitions to be created on an attribute vector is 2, and 4 respectively, with a memory constraint of 400 bytes for each logical partition. At each level in the tree structure (e.g., depth), the number of nodes increase exponentially in multiples of 3. In an embodiment, a first level from the root node has 3 nodes (e.g., 304, 306 and 308); a second level may include 9 nodes (e.g., 304A, 304B, 304C, 306A, 306B, 306C, 308A, 308B and 308C); a third level may include 27 nodes (e.g., 304A1, 304A2, 304A3, (304B1-304B3 (not shown)), 304C1, 304C2, 304C3, 308A1, 308A2, 308A3, (308B1-308B3) (not shown), 308C1, 308C2 and 308C3). The above tree structure 300 hence includes 40 nodes (e.g., root node 302; leaf nodes and child nodes (304, 306, 308, 304A, 304B, 304C, 306A, 306B, 306C, 308A, 308B, 308C, 304A1, 304A2, 304A3, (304B1-304B3 (not shown)), 304C1, 304C2, 304C3, 308A1, 308A2, 308A3, (308B1-308B3) (not shown), 308C1, 308C2 and 308C3)). The complexity of determining the feasible solution (e.g., path) may increase, when the number of logical partitions to be created on the attribute vector increases. For instance, in the example above, when a request for searching data is received the number of leaf nodes to be searched is limited to 27 (e.g., 304A1, 304A2, 304A3, (304B1-304B3 (not shown)), 304C1, 304C2, 304C3, 308A1, 308A2, 308A3, (308B1-308B3) (not shown), 308C1, 308C2 and 308C3). By way of example, when the number of logical partitions to be created on the attribute vectors is 10, the tree structure may include 3,486,784,401 leaf nodes. Thus, the complexity of determining the feasible solution increases, when the number of attribute vectors to be optimized increases.

FIG. 4 is a block diagram exemplarily illustrating a matrix including a number of nodes generated, according to an embodiment. By way of illustration, FIG. 4 shows a matrix of rows and columns including a number of attribute vectors to be optimized and an optimal number of logical partitions to be created on the attribute vectors. The first row of the matrix indicated by 402 represents the optimal number of logical partitions that may be created on an attribute vector. The first column of the matrix indicated by 404 represents the optimal number of attribute vectors that may be optimized to search for data. The values in the remaining rows and columns indicated by 406 represent the number of leaf nodes that may be generated when the tree bounding model is executed.

Figure 5:
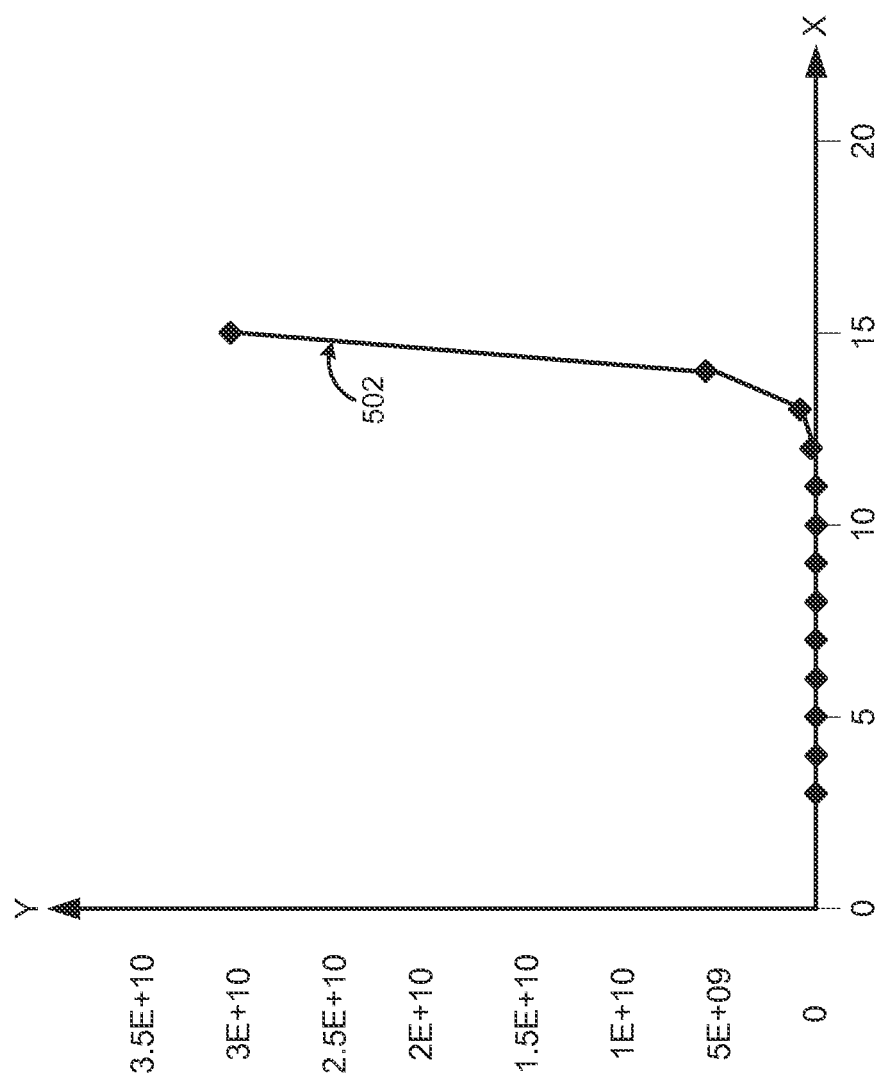
FIG. 5 is a block diagram exemplarily illustrating a graphical illustration of a relation between number of nodes generated for a fixed optimal number of attribute vectors to be optimized, according to an embodiment.

FIG. 5 is a block diagram exemplarily illustrating a graphical illustration of a relation between number of leaf nodes generated for a fixed number of attribute vectors to be optimized, according to an embodiment. By way of illustration, FIG. 5 shows an exponential growth in a number of leaf nodes generated when an optimal number of attribute vectors to be optimized are selected as 5. 'X' axis represents number of attribute vectors; 'Y' axis represents the number of leaf nodes that may be generated by the tree structure. As shown, a graphical illustration 502 of FIG. 5 exhibits an exponential increase in the number of nodes that may be generated.

In an embodiment, the complexity of determining the feasible solution may be reduced by using or enforcing constraints. For instance, the growth of the tree structure may be restricted by restricting the number of nodes generated. The generation of the number of nodes may be restricted by execution of a tree bounding algorithm. The execution of the tree bounding algorithm may trim the tree based on the constraints (e.g., minimum number of logical partitions, maximum number of logical partitions, minimum number of nodes, maximum number of nodes, memory constraints, etc.). For instance, the tree structure may be trimmed (e.g., restrict the number of nodes) by execution of the tree bounding algorithm, which may use/enforce the memory constraint to trim the tree structure. By way of example, when a memory constraint of 1 megabyte (MB) is enforced, it may be determined that the optimal number of attribute vectors to be optimized as 10, and the depth of the tree structure may be trimmed (e.g., generation of the tree structure may be restricted) to $6^{th}$ level to conform to the above constraints (e.g., 1 MB memory constraint and 10 attribute vectors).

In an embodiment, when a node is created, it may be validated against the memory constraint. Upon successful validation, the node may be included in the tree structure. By way of example, a node may be included in the tree structure when a minimum number of logical partitions to be created for an attribute vector are assumed and a validation is performed using the memory constraint. When such a validation fails, the node may not be included in the tree structure. By way of yet another example, a node maybe included in the tree structure when a maximum number of logical partitions to be created for the attribute vectors are assumed and a validation is performed using a memory constraint associated with a threshold value. When such a validation fails, the node may not be included in the tree structure. In an embodiment, subsequently when the node fails the validations (e.g., as described above), the generation of nodes may be stopped and the growth of tree structure is trimmed (e.g., restricted).

In an embodiment, the amount of memory saved (not scanned) when performing a search may be proportional (e.g., directly) to the number of logical partitions to be created on the attribute vector. In an embodiment, the feasible solution (e.g. determine an optimal number of logical partitions to be created on the attribute vectors and/or determine number of attribute vectors to be optimized for searching data) may be determined from the trimmed tree structure. A solution may be determined as feasible, when the solution is successfully validated against all constraints (e.g., memory constraints).

In an embodiment, the amount of memory consumed by a path of the tree structure may be computed by formulating the objective function, as:

$$Ocu = \frac{((S_1 * B_1) + (S_1 * S_2 * B_2) + (S_1 * S_2 * \ldots \ldots * S_N * B_N)) * 100}{Om} \quad \text{Equation (14)}$$

In equation (14), '$O_{cu}$' represents the percentage of memory consumed (e.g., utilized) by the path of the tree structure that may be restricted by using the memory constraint associated with a threshold value. In an embodiment, the threshold value may represent a percentage of unused memory (e.g., unutilized memory). The unused memory may represent a percentage of the actual memory constraint. For instance, the feasible solution may be determined by applying or enforcing the following memory constraint:

$$(100 - Ocu) \leq 10\% \quad \text{Equation (15):}$$

In equation (15), the percentage value 10% represents the threshold value associated with the memory constraint. This threshold value may represent the amount unused memory that may be iteratively modified to converge to the feasible solution.

In an embodiment, the tree bounding model (e.g., tree bounding algorithm) may be executed to create or generate the tree structure with bounded constraints. The tree bounding algorithm may begin execution from a root node (e.g., a root node may be created by assuming optimal number of attribute vectors to be optimized and/or logical partitions associated with the attribute vectors). Subsequently nodes (e.g., leaf nodes, child nodes, etc.) may be added (e.g., by calling or executing the method/function to create new nodes/new attribute vectors) to the tree structure. For each iteration, a leaf (and child node) node may be created, validated to check if the leaf node (and child node) meets the memory constraint and then included to the tree structure. For instance, when the node is created, it may be assigned with a highest optimal number of logical partitions. This optimal number of logical partitions may be iteratively reduced and validated against the memory constraint. Upon determining a feasible solution, the process of creating nodes may terminate. In an embodiment, upon terminating the creation of nodes, the corresponding node information, such as attribute vector index, number of logical partitions for the corresponding attribute vector, number of attribute vector blocks, etc., may be updated.

In an embodiment, for each iteration, information related to number of logical partitions to be created may be determined. A child node attribute index may be updated using the equation:

$$\text{child node attribute vector index} = \text{parent node attribute vector index} + 1 \quad \text{Equation (15):}$$

The information related to the Block Transition Index (BTI) may be updated using the equation:

$$\text{number of BTI blocks for child node} = \text{number of BTI blocks of parent node} \ast \text{number of logical partitions of the attribute vector} \quad \text{Equation (16):}$$

In an embodiment, the attribute vectors may be validated against the memory constraint. As explained previously (e.g., validating anode against memory constraint and including the node in the tree structure), the validation may be executed to determine the condition for termination of execution of the algorithm. When the algorithm termination condition is met, the tree bounding algorithm stops execution and generation of new nodes. The growth tree structure may be trimmed (e.g., restricted), when the algorithm execution termination conditions are met. In an embodiment, multiple child nodes may be associated with leaf nodes (e.g., parent node) and may be included in the tree structure and the corresponding node information may be updated.

Figure 6:
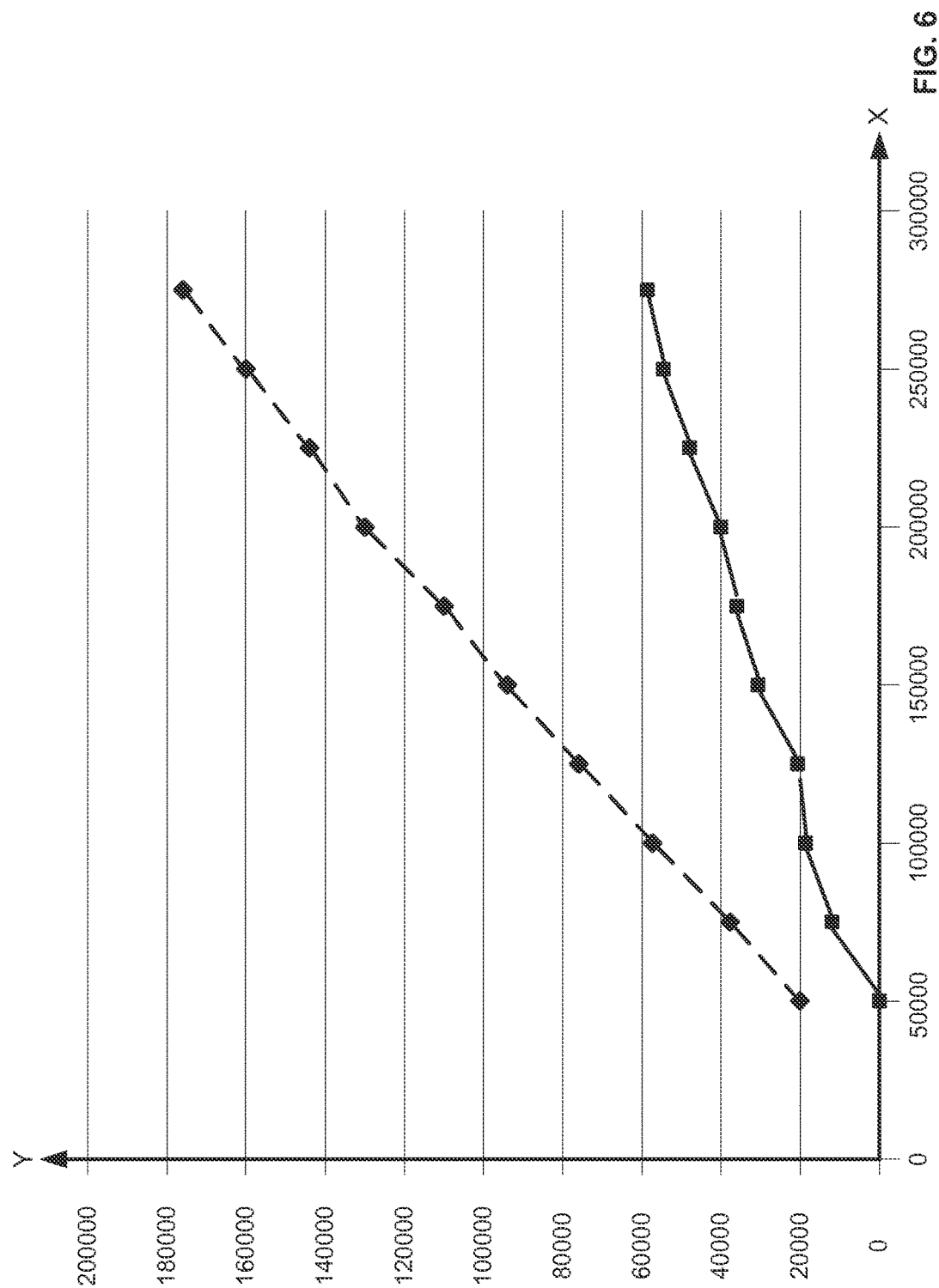
FIG. 6 is a block diagram exemplarily illustrating a graphical illustration of a relation between an amount of memory consumed and number of nodes, according to an embodiment.

FIG. 6 is a block diagram exemplarily illustrating a graphical illustration of a relation between an amount of memory consumed and number of nodes, according to an embodiment. By way of illustration, FIG. 6 shows a linear relation between an amount of memory consumed and a number of nodes in a tree structure. 'X' axis of the graph represents the amount of memory consumed and 'Y' axis represents the number of nodes. As exemplarily illustrated, FIG. 6 shows operational efficacy of using the memory constraint to restrict the number of nodes and trimming the growth of the tree structure. Upon determining the optimal number of attribute vectors to be optimized (e.g., as explained previously) as 7, it may be determined that the number of nodes generated is equal to 5,380,840 (e.g., when the nodes are generated without using bounding constraints when the optimal number of partitions varies from 9 to 2 virtual split to 10 virtual split). By way of illustration, FIG. 6 shows that when a memory constraint is increased from 50,000 bytes (e.g., approximately 48.8 KB) to 275,000 bytes (e.g., approximately 268.5 KB), the number of trimmed nodes generated increases linearly as shown by dashed line. The generation of the number of leaf nodes for the determined optimal number of attribute vectors to be optimized (e.g., 7 attribute vectors) may restrict the generation of leaf nodes to 55,704 as shown by solid line in FIG. 6.

Figure 7:
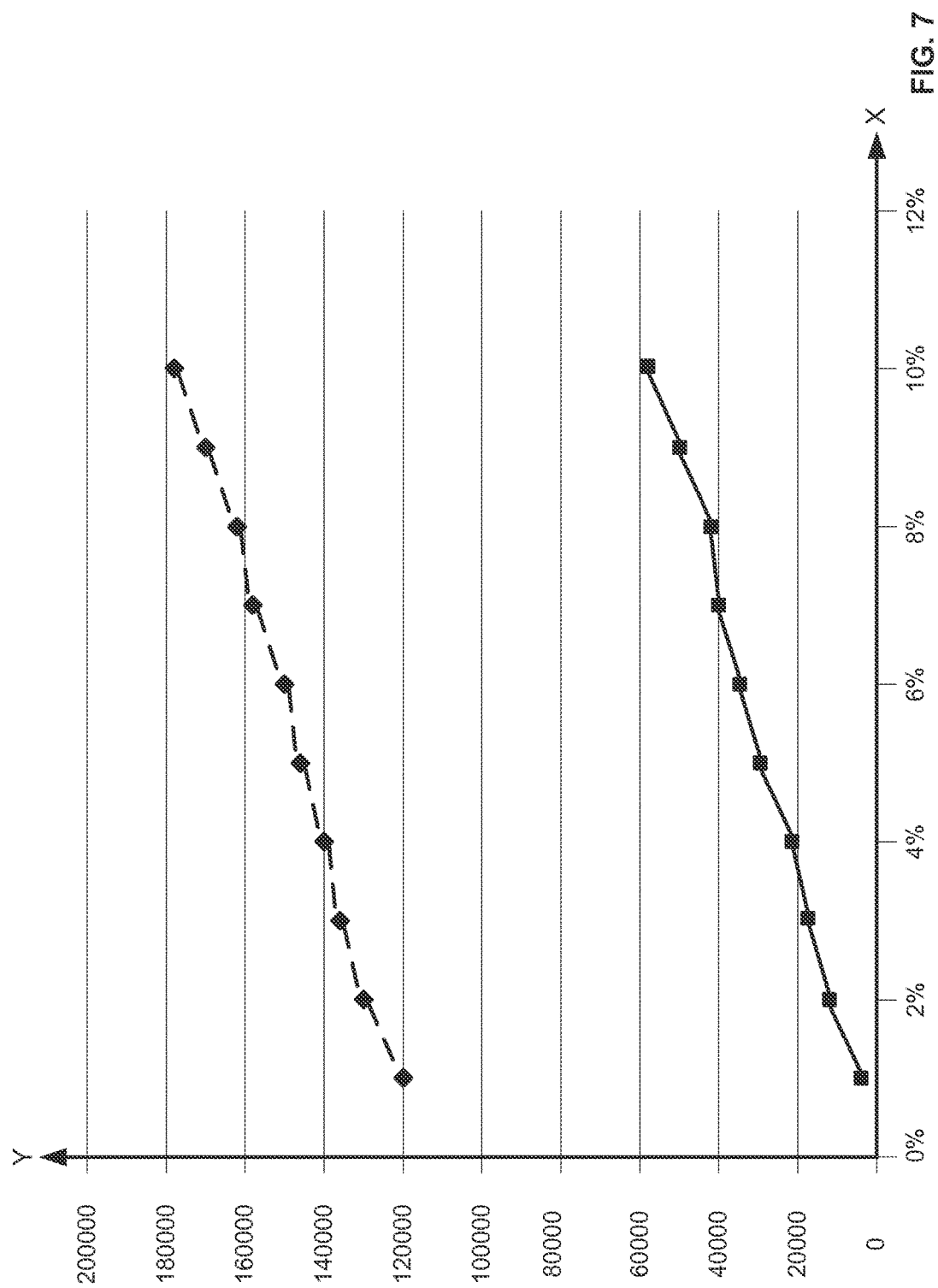
FIG. 7 is a block diagram exemplarily illustrating a graphical illustration of a relation between a number of nodes and a percentage threshold value associated with memory constraint, according to an embodiment.

FIG. 7 is a block diagram exemplarily illustrating a graphical illustration of a relation between a number of nodes and a percentage threshold value associated with memory constraint, according to an embodiment. By way of illustration, FIG. 7 shows a linear relation between the number of nodes and a percentage threshold value (e.g., unused memory/unutilized memory associated with the memory constraint. By way of example, 7 attribute vectors may be optimized with the optimal number of logical partitions as 9. The optimal number of logical partitions may be determined by iteratively reducing the number of optimal number of logical partitions between 10 and 2 with the memory constraint of 275 KB (Kilobytes). 'X' axis represents the percentage unused memory (varying from 1% to 10%) associated with the memory constraint and 'Y' axis represents the number of nodes. By way of example, it may be determined that the optimal number of attribute vectors to be optimized for searching as 7, and constraint of percentage threshold value is applied, the number of leaf nodes generated decreases from 55,704 to 5,600 leaf nodes (shown as solid line in FIG. 7) and respectively overall trimmed nodes decreases too (shown as dashed line in FIG. 7).

Figure 8:
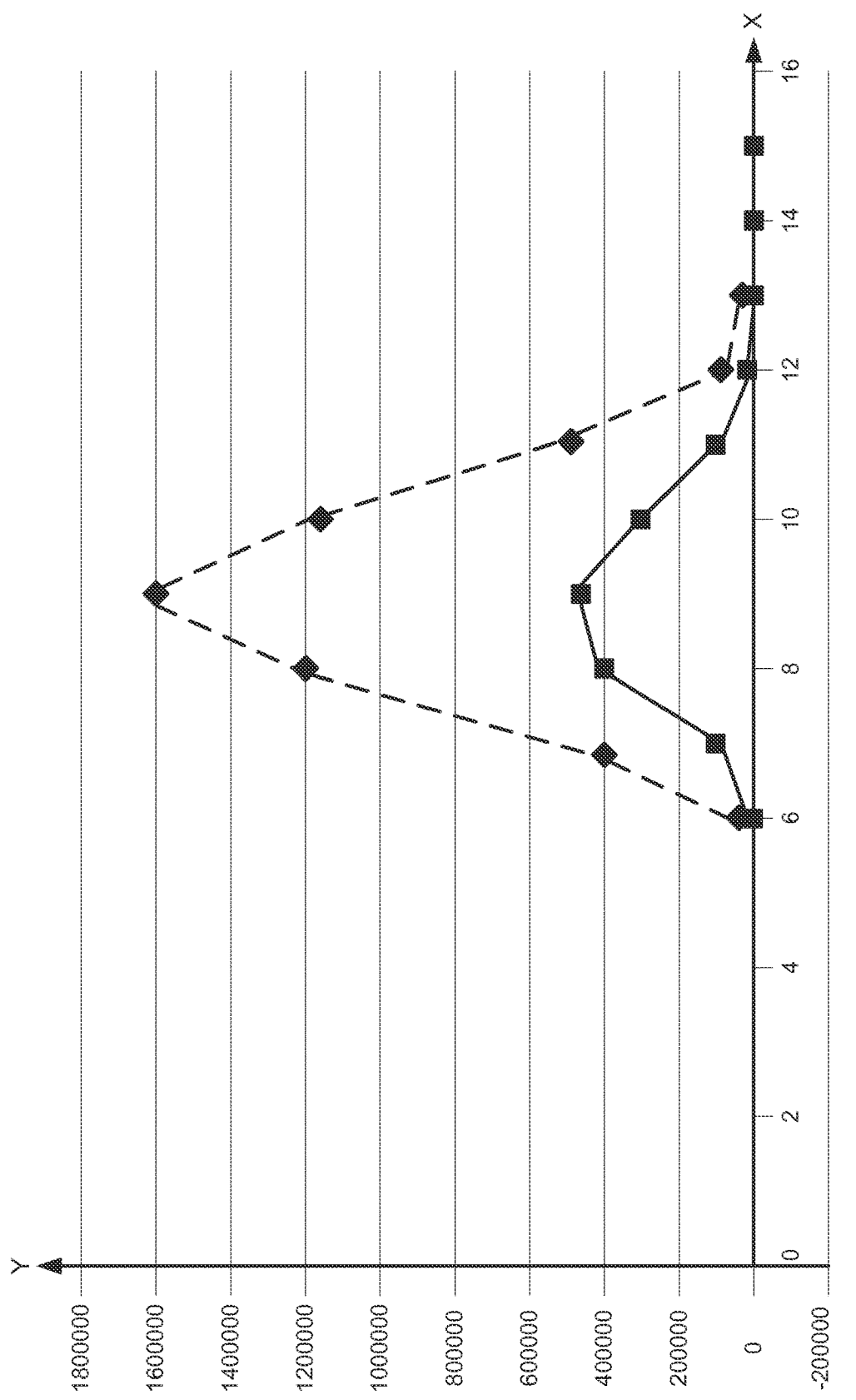
FIG. 8 is a block exemplarily illustrating a graphical illustration of a relation between a number of nodes and number of attribute vectors to be optimized, according to an embodiment.

FIG. 8 is a block exemplarily illustrating a graphical illustration of a relation between a number of nodes and number of attribute vectors to be optimized, according to an embodiment. By way of illustration, FIG. 8 shows a relation between the number of nodes and the number of attribute vectors to be optimized. By way of example, when a percentage threshold value of 10% (e.g., unutilized memory) associated with a memory constraint of 1 MB is enforced, the relation between the number of nodes and the number of attribute vectors to be optimized may be determined. As shown in FIG. 8, the numbers of nodes increase with the number of attribute vectors to be optimized (between 6 to 15 attribute vectors) when the number of partitions varies from 2 to 10 for all attribute vectors. For instance, the numbers of nodes increases with the number of attribute vectors to be optimized. The count of number of leaf nodes is maximum (e.g., peak, when count of number of nodes is 477,727, shown by solid line) when the count of number of attribute vectors is 9. Subsequently, as the count of number of attribute vectors increases, the slope of the graph decreases indicating a decrease in the count of the number of nodes due to 1 MB memory constraint. The slope of the graph decreases (e.g., generation of number of nodes is restricted/tree structure is trimmed shown in dashed line) when validation of the number of attribute vectors to be optimized against the memory constraint (e.g., 1 MB) succeeds.

Figure 9:
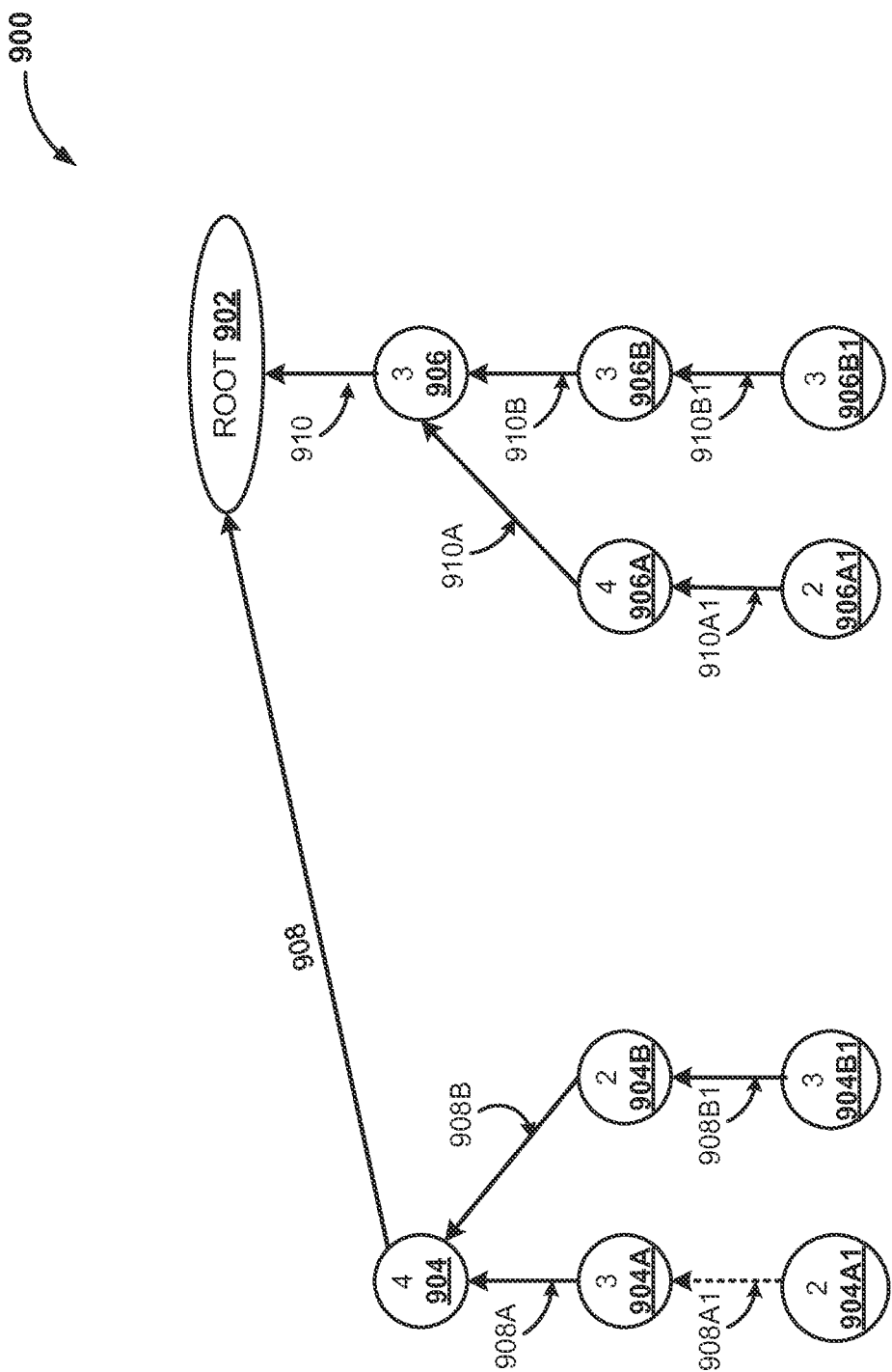
FIG. 9 is block diagram exemplarily illustrating a tree structure, according to an embodiment.

FIG. 9 is block diagram exemplarily illustrating a tree structure 900, according to an embodiment. By way of illustration, FIG. 9 shows tree structure 900 that is trimmed by applying memory constraint. The tree structure 900 may be trimmed by execution of tree bounding algorithm. As explained previously, the execution of the tree bounding algorithm restricts the generation of number of nodes (e.g., root node 902 and child or leaf nodes 904, 906, 904A, 904B, 906A, 906B, 904A1, 904B1, 906A1, 906B1, etc.) based on memory constraint. FIG. 9 shows 4 nodes (e.g., 904A, 904B, 906A and 906B) that are created (as against 27 of FIG. 3, that was generated without the memory constraint), with an overall memory consumption of 400 bytes. In an embodiment, each node of the trimmed tree structure 900 may include information, such as parent node, child node, amount of memory consumed, number of logical partitions to be created on the attribute vectors, etc.

In an embodiment, upon generating the trimmed tree structure 900 by executing the tree bounding algorithm, the paths (e.g., 908, 910, 908A, 908B, 908A1, 908B1, 910, 910A, 910B, 910A1 and 910B1) of the trimmed tree structure 900 may be traversed to determine the feasible solution (e.g., determine an optimal number of attribute vectors to be optimized). The trimmed tree structure 900 may be traversed from left to tight (e.g., from left nodes to right nodes). In an embodiment, a validation may be performed to check if the node can be included as a leaf node (e.g., first leaf node) in the tree structure. Upon determining that the node can be included as the leaf node (e.g., first leaf node), an objective function may be formulated to determine/compute the amount of memory saved when performing a search. The process of traversing the tree structure may continue and determining whether the next leaf node (e.g., second leaf node, third leaf node, etc.) can be included in the tree structure. Upon such determination, the objective function for the respective leaf nodes (e.g., second leaf node, third leaf node, etc.) may be formulated and the amount of memory saved may be computed.

In an embodiment, the amount of memory saved by each leaf node may be compared with each other. Based on the comparison, the feasible solution (e.g., the optimal number of attribute vectors to be optimized) may be determined. In an embodiment, the above determination of amount of memory saved for each node may include memory saved and/or consumed by the child nodes (e.g., when the leaf nodes have child nodes).

In an embodiment, a determined partitioning model may include a random approximation model. The execution of random approximation model (e.g., random approximation algorithm) may determine optimal number of logical partitions to be created on the attribute vectors. The execution of the random approximation algorithm may include randomly selecting the number of partitions to be created on the attribute vectors. Such a random selection of the logical partitions to be created on the attribute vectors may correspond to a number between the minimum number of logical partitions and the maximum number of logical partitions based on the memory constraint.

In an embodiment, the non-linear approximation algorithm may be used to compute the amount of memory consumed by each attribute vector, when the attribute vectors are logically partitioned. As explained previously, the execution of the non-linear approximation algorithm may determine the optimal number of partitions to be created on the attribute vectors, based on the memory constraint. In an embodiment, the random approximation algorithm may terminate execution based on parameters, such as specified amount of time, a comparison of amount of memory saved by each attribute vector for each iteration of the execution of the algorithm, etc.

Multiple Tables and Multiple Attribute Vectors Optimization

In an embodiment, a table in an in-memory database may include multiple attribute vectors. An optimal number of logical partitions to be created on each attribute vector may be determined and the attribute vectors may be logically partitioned and optimized for searching data. The optimal number of logical partitions to be created may be determined based on constraints (e.g., memory constraints, size of the table, size of attribute vectors, etc.). In an embodiment, an overall memory constraint may be assigned to the table.

In an embodiment, a size or number of records in the table may be determined and the memory constraint may be assigned to table. For instance, based on the overall memory constraint assigned to the table, the attribute vectors in the table may be allocated a uniform memory constraint. By way of example, suppose that the table includes 1 billion record entries then the uniform memory constraint of 1 MB may be allocated to each table. In another embodiment, variable memory constraints may be allocated for a range of records (e.g., number of entries) in the table. For instance, the range of records in the table may be divided based on a business logic and memory constraints may be allocated to each range of records. Such a range based allocation of memory constraints may herein be referred to as staggered allocation. In an embodiment, each attribute vector in the table (or the table) may be validated against the memory constraint (e.g., as explained previously), assigned priority, reordered, logically partitioned and optimized for searching data (e.g., by executing the reordering optimization model, the partitioning optimization model, the tree bounding model, the random approximation model, etc.).

TABLE 'A'

| RECORD RANGE | | MEMORY CONSTRAINT (KILO BYTES) |
| --- | --- | --- |
| 0 | 10 billion | 100 |
| 10 billion | 100 billion | 500 |
| 100 billion | 1000 billion | 1000 |

By way of example, Table 'A' shows staggered allocation of memory constraints for range of records. The "RECORD RANGE" columns define a range of records and a corresponding allocated memory constraint is as indicated in "MEMORY CONSTRAINT" column.

In another embodiment, in addition to range of records, the number of attribute vectors to be optimized may be explicitly included for memory allocation. By way of example, the attribute vectors may be optimized by specifying range of number of records (e.g., 5 billion) and the number of attribute vectors (e.g., 15). The specified number of attribute vectors are selected as the optimal number of attribute vectors to be optimized, logically partitioned (e.g., by executing partitioning optimization models) and the data in the attribute vectors (e.g., corresponding attribute vector blocks, when logically partitioned) are rearranged to optimize for searching.

In an embodiment, multiple tables residing in the database and storing data that may be optimized for searching data. The tables in the database may be optimized for searching by executing the reordering optimization model and the partitioning optimization models. The business logic for assigning priorities, computing sequence score, reordering, determining and executing partitioning model and logically partitioning the attribute vectors may be implemented for the tables residing in the database. However, the memory constraints allocated to the tables may be considered when executing the above operations (e.g., assigning priorities, computing sequence score, reordering, determining and executing partitioning model, logically partitioning the attribute vectors in the tables, etc.).

In an embodiment, determining the memory constraint to be assigned to the table may depend on the priority assigned to the table. By way of example, a table that is assigned the highest priority may be allocated a higher memory constraint (e.g., 1 MB), while the table that is assigned a lower priori may be allocated a lower memory constraint (e.g., 100 KB).

In an embodiment, the amount of memory consumed by an $i^{th}$ table may be computed using the equation:

$$\text{Memory consumed by } i^{th} \text{ table} = \left(\frac{P_i}{\sum_{j=1}^{N} P_j}\right) * O_{dbm} \qquad \text{Equation (17)}$$

In equation (17), '$P_i$' represents the priority of $i^{th}$ table; '$O_{dbm}$' represents the overall constraint memory consumed by the database. The tables are optimized for searching data based on the assigned priority.

In an embodiment, the amount of memory consumed by the table may be optimized by formulating and maximizing the objective function for tables. The objective function may be formulated as:

$$\sum_{i=1}^{N} P_i * M_i \qquad \text{Equation (18)}$$

Equation (18) may be maximized by enforcing or applying the following constraint:

$$\sum_{i=1}^{N} O_i <= O_{total} \qquad \text{Equation (19)}$$

In equations (18) and (19), '$P_i$' may represent the priority of the table; '$M_i$' represents the amount of memory saved during search for the $i^{th}$ table; '$O_{total}$' represents the overall memory allocated; and '$O_i$' represents the memory consumed by the $i^{th}$ table.

In an embodiment, the tables in the database may be optimized for searching by dividing the allocated memory constraint and optimizing the least priority table. Sequentially higher priority tables may be allocated memory constraints based on business logic (e.g., amount of memory that remains unused by lower priority tables) and optimizing the tables with higher priority assignment. In an embodiment, there may be an additional overhead of sorting the tables based on priority and the total memory consumed.

In an embodiment, upon assigning priorities to the table, the sequence score for a table may be computed using the equation:

$$\text{Sequence score for a table} = \frac{2 * P_i * T_i}{(Pi + T_i)} \qquad \text{Equation (20)}$$

In equation (20), '$P_i$' represents priority of ith table; and '$T_i$' represents the total memory consumed by the $i^{th}$ table.

Updates During Delta Merges

In an embodiment, in an in-memory database, data modifications may be initially saved in a delta storage that is optimized for write access. A delta merge (e.g., procedure or algorithm) may be used to transfer modifications from the delta storage to a main storage. An asynchronous check is performed to determine whether a delta merge is required. If a threshold value is exceeded, the merge is carried out in the delta storage. When a read access is executed, the data is read from the main storage and the delta storage and the results are merged together.

In an embodiment, after executing the delta merge, the data in the tables may be optimized for searching by executing the reordering optimization model and the partitioning optimization models (e.g., as explained previously). The re-structured tables (and the attribute vectors may be re-optimized for searching upon execution of the delta merge. In an embodiment, the execution of optimization algorithms (e.g., the reordering optimization model, the partitioning optimization models, etc.) may be periodically scheduled to be executed after the delta merges.

Figure 10:
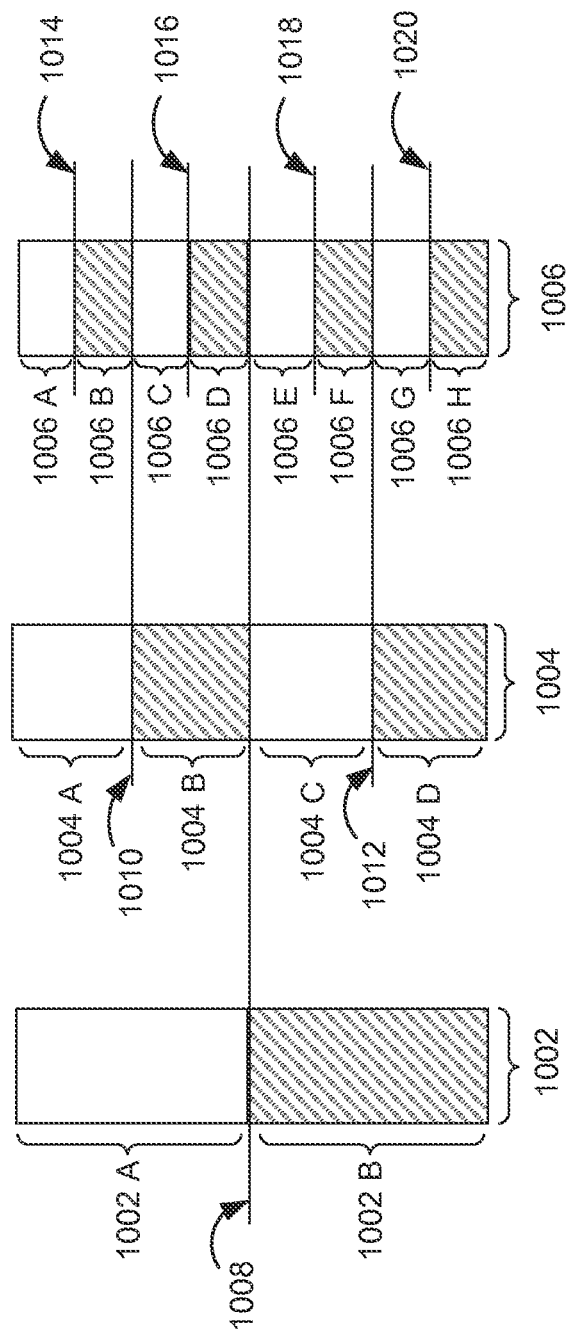
FIG. 10 is a block diagram exemplarily illustrating logical partitioning of attribute vectors, according to an embodiment.

FIG. 10 is a block diagram exemplarily illustrating logical partitioning of attribute vectors, according to an embodiment. By way of illustration, FIG. 10 shows attribute vectors 1002, 1004 and 1006 of a table residing in a data store. The attribute vectors 1002, 1004 and 1006 are associated with a corresponding dictionary structure. As explained previously, the attribute vectors 1002, 1004, and 1006 may be logically into attribute vector blocks. By way of illustration, FIG. 10 shows attribute vector blocks 1002A and 1002B corresponding to attribute vector 1002. Likewise, 1004A, 1004B, 1004C and 1004D represent attribute vector blocks corresponding to attribute vector block 1004; and 1006A, 1006B, 1006C, 1006D, 1006E, 1006F, 1006G and 1006H represent attribute vector blocks corresponding to attribute vector block 1306.

In an embodiment, the lines 1008, 1010, 1012, 1014, 1016, 1018 and 1020 indicate the respective transition points between the attribute vector blocks. As explained previously, the ValueIds in the attribute vector blocks may be rearranged to optimize the attribute vector blocks to search for data. By way of example, the attribute vector block 1002 includes one logical partition that generates two attribute vector blocks (1002A, 1002B). Likewise, the attribute vector block 1004 includes three logical partitions that generate four attribute vector blocks (1004A, 1004B, 1004C and 1004D).

In an embodiment, the attribute vector block 1006 may include seven logical partitions that generate eight attribute vector blocks (1006A-1006H). As explained previously, the attribute vectors may be assigned priority, sequence score be computed and reordered (e.g., by execution reordering optimization model or algorithm). Upon reordering, the optimal number of logical partitions for each attribute vector may be determined and the attribute vectors may be logically partitioned. By way of example, attribute vector 1006 may be assigned the highest priority; attribute vector 1004 may be assigned a lower priority and so on. Upon execution of reordering optimization model and partitioning optimization model, it may be determined that the optimal number of logical partitions for each attribute vector includes 7 (for attribute vector 1006), 3 (for attribute vector 1004) and 1 (for attribute vector 1002). Thus, each attribute vector may include variable number of logical partitions or variable number of splits. In an embodiment, ValueIds in the attribute vector blocks may be rearranged in the attribute vector blocks to optimize the attribute vectors to search for data.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a tangible computer readable storage medium. A computer readable storage medium may be a non-transitory computer readable storage medium. Examples of a non-transitory computer readable storage media include, but are not limited to: magnetic media, such as hard disks, floppy disks, and magnetic (ape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 11:
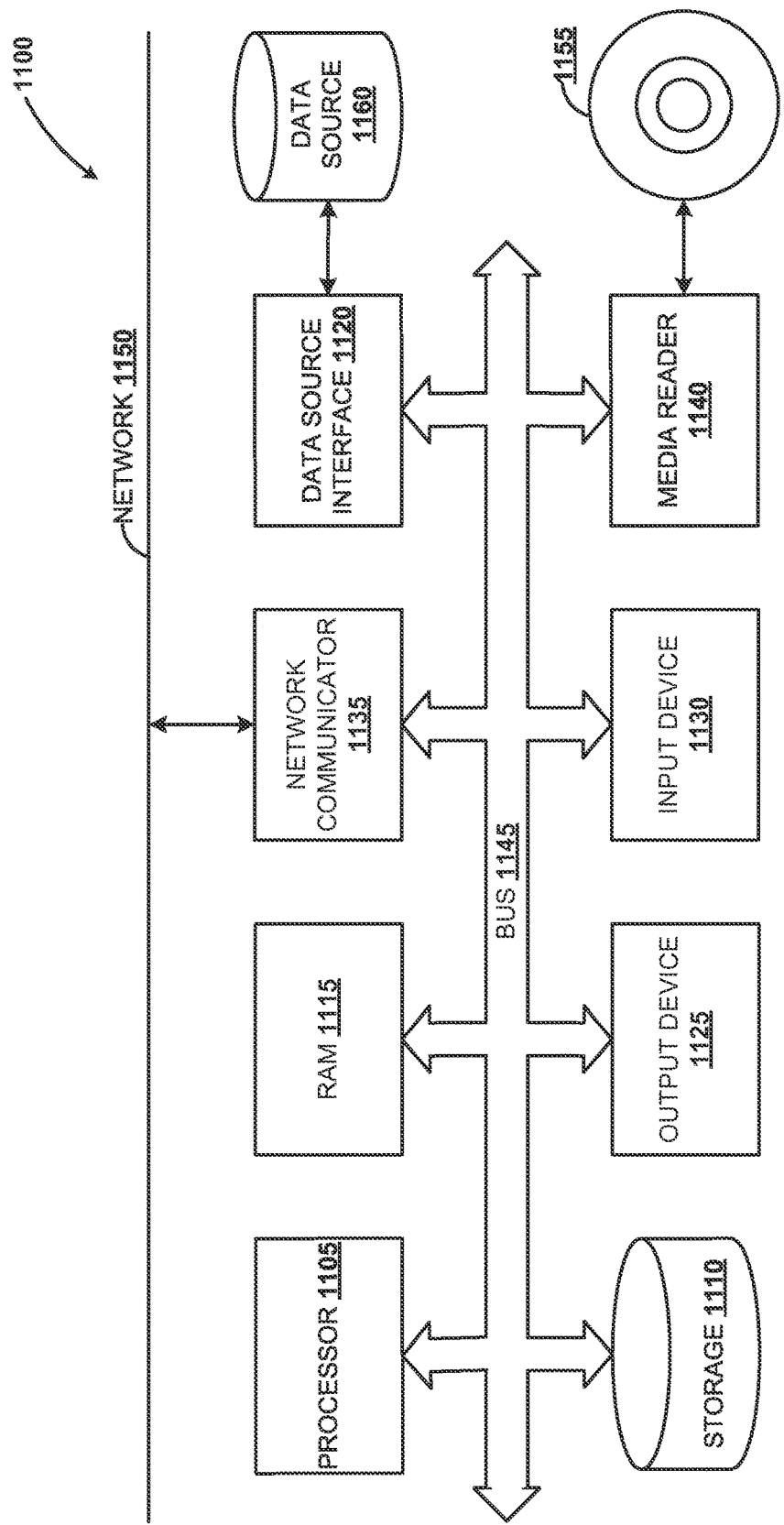
FIG. 11 is a block diagram of a computer system, according to an embodiment.

FIG. 11 is a block diagram of an exemplary computer system 1100, according to an embodiment. Computer system 1100 includes processor 1105 that executes software instructions or code stored on computer readable storage medium 1155 to perform the above-illustrated methods. Processor 1105 can include a plurality of cores. Computer system 1100 includes media reader 1140 to read the instructions from computer readable storage medium 1155 and store the instructions in storage 1110 or in random access memory (RAM) 1115. Storage 1110 provides a large space for keeping static data where at least some instructions could be stored for later execution. According to some embodiments, such as some in-memory computing system embodiments, RAM 1115 can have sufficient storage capacity to store much of the data required for processing in RAM 1115 instead of in storage 1110. In some embodiments, all of the data required for processing may be stored in RAM 1115. The stored instructions may be further compiled to generate other representations of the instructions and dynamically stored in RAM 1115. Processor 1105 reads instructions from RAM 1115 and performs actions as instructed. According to one embodiment, computer system 1100 further includes output device 1125 (e.g., a display) to provide at least some of the results of the execution as output including, but not limited to, visual information to users and input device 1130 to provide a user or another device with means for entering data and/or otherwise interact with computer system 1100. Each of these output devices 1125 and input devices 1130 could be joined by one or more additional peripherals to further expand the capabilities of computer system 1100. Network communicator 1135 may be provided to connect computer system 1100 to network 1150 and in turn to other devices connected to network 1150 including other clients, servers, data stores, and interfaces, for instance. The modules of computer system 1100 are interconnected via bus 1145. Computer system 1100 includes a data source interface 1120 to access data source 1160. Data source 1160 can be accessed via one or more abstraction layers implemented in hardware or software. For example, data source 1160 may be accessed by network 1150. In some embodiments data source 1160 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to optimize data searching in an in-memory database stored as a column store, the method comprising:
    assigning priorities to a plurality of attribute vectors including value identifiers that represent values of corresponding columns of a table of structured data;
    basing the priorities for each of the plurality of attribute vectors on a frequency of data access from each respective attribute vector of the plurality of attribute vectors;
    a processor of a computer executing a reordering optimization model to reorder the plurality of attribute vectors based on corresponding sequence scores, the corresponding sequence scores computed based on one or more of the assigned priorities, a memory size consumed by each of the plurality of attribute vectors, a historical data access metric, and a query referencing percentage for each of the plurality of attribute vectors;
    upon computing the corresponding sequence scores and reordering the plurality of attribute vectors, the processor of the computer executing a partitioning optimization model to logically partition each of the plurality of attribute vectors into a varying optimal number of logical partitions, the partitioning optimization model analyzing a tree bounding model having multiple paths between a root node and a leaf node to determine an optimal path from among the multiple paths;
    determining an optimal number of logical partitions for a respective attribute vector of the plurality of attribute vectors based on conditions including the priority of the respective attribute vector and a memory constraint, the memory constraint dependent on the memory size consumed by the respective attribute vector and an amount of memory available to create logical partitions of the respective attribute vector;
    based on the partitioning, for each of the plurality of attribute vectors generating one or more attribute vector blocks; and
    rearranging value identifiers in the one or more attribute vector blocks to additionally optimize searching for data in the table of structured data.

2. The computer implemented method of claim 1, wherein the partitioning optimization model is selected from a group consisting of a greedy recursive approximation model, a non-linear approximation model, a non-linear approximation model with relaxation, a random approximation model and a tree bounding model.

3. The computer implemented method of claim 1, wherein the execution of the reordering optimization model, further comprises:
    assigning priorities to a plurality of tables of the in-memory database based on business logic;
    based on the assigned priorities, computing sequence scores corresponding to the plurality of tables; and
    based on the sequence score, reordering the tables.

4. A computer system to optimize data searching in an in-memory database stored as a column store, comprising:
    a memory storing computer instructions; and
    a processor communicatively coupled with the memory to execute the computer instructions to perform operations comprising:
        assign priorities to a plurality of attribute vectors including value identifiers that represent values of corresponding columns to a table of structured data;
        base the priorities for each of the plurality of attribute vectors on a frequency of data access from each respective attribute vector of the plurality of attribute vectors;
        execute a reordering optimization model to reorder the plurality of attribute vectors based on corresponding sequence scores, the corresponding sequence scores computed based on one or more of the assigned priorities, a memory size consumed by each of the plurality of attribute vectors, a historical data access metric, and a query referencing percentage for each of the plurality of attribute vectors;
        upon computing the corresponding sequence scores and reordering the plurality of attribute vectors, execute a partitioning optimization model to logically partition each of the plurality of attribute vectors into a varying optimal number of logical partitions, the partitioning optimization model analyzing a tree bounding model having multiple paths between a root node and a leaf node to determine an optimal path from among the multiple paths;
        determining an optimal number of logical partitions for a respective attribute vector of the plurality of attribute vectors based on conditions including the priority of the respective attribute vector and a memory constraint, the memory constraint dependent on the memory size consumed by the respective attribute vector and an amount of memory available to create logical partitions of the respective attribute vector;
        based on the partitioning, for each of the plurality of attribute vectors generate one or more attribute vector blocks; and
        rearrange value identifiers in the one or more attribute vector blocks to optimize searching for data in the table of structured data.

5. The computer system of claim 4, wherein the partitioning optimization model is selected from a group consisting of a greedy recursive approximation model, a non-linear approximation model, a non-linear approximation model with relaxation, a random approximation model and a tree bounding model.

6. The computer system of claim 4, wherein executing the reordering optimization model, further comprises:
    assigning priorities to a plurality of tables of the in-memory database based on business logic;
    based on the assigned priorities, computing sequence scores corresponding to the plurality of tables; and
    based on the sequence scores, reordering the plurality of tables.

7. A non-transitory computer readable storage medium tangibly storing instructions, which when executed by a computer, cause the computer to execute operations comprising:
   assign priorities to a plurality of attribute vectors including value identifiers that represent values of corresponding columns of a table of structured data of in-memory database stored as a column store;
   base the priorities for each of the plurality of attribute vectors on a frequency of data access from each respective attribute vector of the plurality of attribute vectors;
   execute a reordering optimization model to reorder the plurality of attribute vectors based on corresponding sequence scores, the corresponding sequence scores computed based on one or more of the assigned priorities, a memory size consumed by each of the plurality of attribute vectors, a historical data access metric, and a query referencing percentage for each of the plurality of attribute vectors;
   upon computing the corresponding sequence scores and reordering the plurality of attribute vectors, execute a partitioning optimization model to logically partition each of the plurality of attribute vectors into a varying optimal number of logical partitions, the partitioning optimization model analyzing a tree bounding model having multiple paths between a root node and a leaf node to determine an optimal path from among the multiple paths;
   determining an optimal number of logical partitions for a respective attribute vector of the plurality of attribute vectors based on conditions including the priority of the respective attribute vector and a memory constraint, the memory constraint dependent on the memory size consumed by the respective attribute vector and an amount of memory available to create logical partitions of the respective attribute vector;
   based on the partitioning, for each of the plurality of attribute vectors generate one or more attribute vector blocks; and
   rearrange value identifiers in the one or more attribute vector blocks to optimize searching for data in the table of structured data.

8. The non-transitory computer readable storage medium of claim 7, wherein the plurality of attribute vectors is reordered in a descending order of the corresponding sequence scores.

9. The non-transitory computer readable storage medium of claim 7, wherein the partitioning optimization model is selected from a group consisting of a greedy recursive approximation model, a non-linear approximation model, a non-linear approximation model with relaxation, a random approximation model and a tree bounding model.

10. The non-transitory computer readable storage medium of claim 7, storing instructions, which when executed by a computer, cause the computer to further execute operations comprising, wherein the execution of the reordering optimization model, further comprises:
   assigning priorities to a plurality of tables of the in-memory database based on business logic;
   based on the assigned priorities, computing sequence scores corresponding to the plurality of tables; and
   based on the sequence scores, reordering the plurality of tables.

11. The non-transitory computer readable storage medium of claim 9, wherein execution of the tree bounding model generates a tree structure including one or more nodes and one or more paths to the one or more nodes.

* * * * *